June 1, 1926.
W. E. WINE
TRACTOR SHOE
Original Filed June 22, 1925
1,586,934
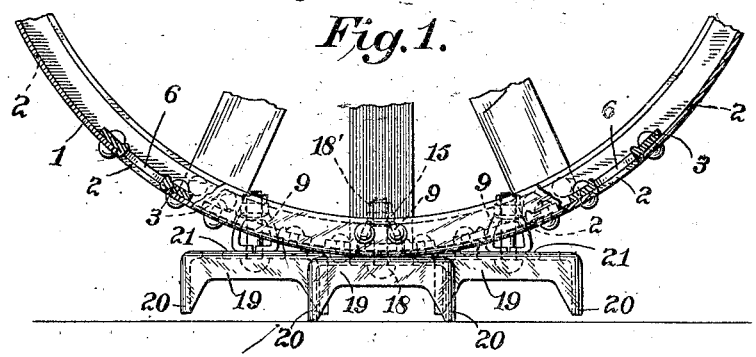
Fig.1.
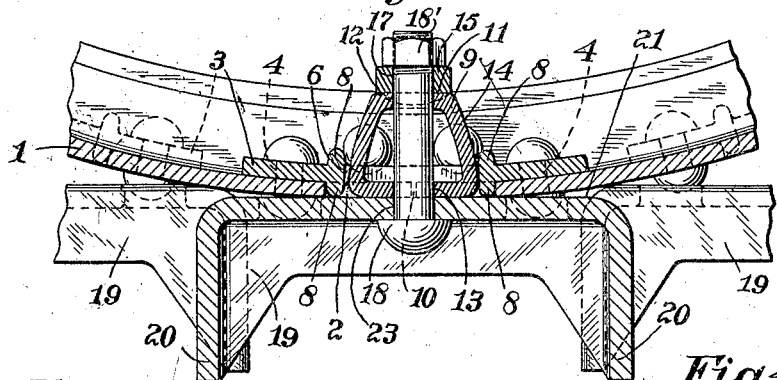
Fig.2.
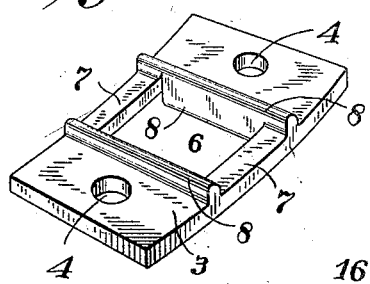
Fig.3.
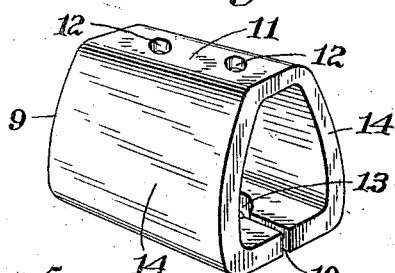
Fig.4.
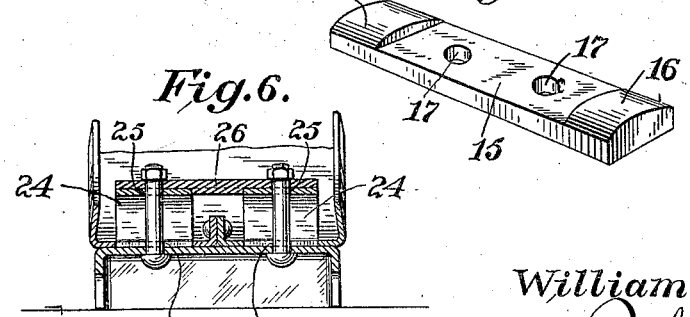
Fig.5.
Fig.6.
Inventor:
William E. Wine,
by Parker Cook
Atty.

Patented June 1, 1926.

1,586,934

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR SHOE.

Original application filed June 22, 1925, Serial No 38,678. Divided and this application filed December 22, 1925. Serial No. 77,059.

My invention relates to new and useful improvements in tractor shoes and more especially to the manner in which the retaining means is formed and functions within the wheel rim.

The present application is a divisional one, the parent application having been filed by me on June 22, 1925, bearing Serial Number 38,678.

One of the objects of the present invention is to provide a novel form of retaining means which is rigidly fastened to a tread member, the retaining means being preferably formed of a steel plate which is bent to shape, the ends of the plate being so bent that they lie adjacent and constitute the outer surface of the retaining means.

The inner surface of the retaining means is preferably flat so that a cross bar or locking bar may be secured thereto. Means are provided for holding the cross bar with relation to the retaining means and this same means also functions to secure the retaining means to a tread member.

Another object of the invention is to provide a tractor shoe wherein the tread member and the retaining means are formed of pressed metal so that the shoe as a whole will be relatively light in weight.

With these and other objects in view, the invention consists in certain new and novel costructions and combination of parts as will be hereinafter more fully described and pointed out in the claims.

In the drawings showing a preferred and slightly modified form of my invention:—

Fig. 1 is a fragmentary side elevation of a tractor wheel showing several shoes in their operable position.

Fig. 2 is a fragmentary view, partly in section showing the manner of attaching the shoe.

Fig. 3 is a perspective of a reinforcing plate or housing for the reception of the retaining means of the shoe.

Fig. 4 is a perspective of the retaining means.

Fig. 5 is a perspective of the cross bar which cooperates with the retaining means and housing, and Fig. 6 is a slightly modified form of the retaining means.

Referring now to the drawings more specifically, I have shown a fragmentary portion of a wheel comprising the rim 1, which is in turn provided with a plurality of openings 2, while placed on the inner surface of the rim and about these openings are the plates or housings 3.

Each of these plates is slightly bent to agree with the arc of the rim and is provided with the holes 4 at its opposite ends for the reception of rivets as may be seen in Fig. 3. Centrally of this housing is the opening 6, the side walls 7 and the small lugs or teeth 8 forming the limiting walls of the opening. These lugs or teeth are slightly rounded at their extremities, extend across the housing on one surface and partly across on the other surface and also extend above and below the surfaces as may be seen in the several figures. This plate or housing not only strengthens the rim of the wheel, but provides bearing surfaces to cooperate with the retaining means 9 as will be shortly described.

Referring now more particularly to Fig. 4, there is shown a retaining means 9, I preferably take a flat steel plate, place it in a press and form it in the shape of a tooth, the outer edges of the plate lying adjacent to each other, as shown at 10. The apex of the tooth is pressed flat, as at 11, and is provided with two bolt holes 12, while further holes 13 are formed in the outer wall of the tooth, semi-circular portions being cut out of each of the edges, so that when the tooth is shaped the completed circular openings are provided.

The side walls 14 of the retaining means are inclined as there is a rocking movement imparted to this tooth, and these side walls must contact with the lugs 8 of the housing 3 as the wheel revolves.

In my copending application, Serial No.

21,609, a retaining means in the form of a tooth is shown, but in that instance the tooth is a cast metal one and is provided with a rib extending across the apex which terminates in two small trunnions. In the present instance, the tooth or retaining means is formed of a steel plate which is readily bent to shape and is provided with a flat inner surface for the reception of a separate cross bar which is shortly to be described. In the former instance also, a bolt simply passes from the tread member through the lower wall of the tooth, while in the present instance the bolt passes completely through the tooth and through a separate crossbar as will now be described.

In Fig. 5 I have shown a locking bar 15, the same being shown in its inverted position. The ends 16 of this bar 15 are slightly rounded on their outer surface as these ends rock with the upper surfaces of the end walls 7 of the plate or housing 3 when the bar is in position, and the wheel rotates. This locking bar 15 is also provided with the two holes 17 so that bolts 18, passed through the tread member 19 may also pass through the aforementioned holes 13 and 12 in the retaining means and through the holes in the locking bar after which the nuts 18' may be applied to hold the several parts in their operable position. Of course before this locking bar is applied, the retaining means 9 will be passed through the opening 2 in the wheel rim and through the opening 6 of the plate 3.

Referring now to the tread member 19, it might be mentioned that this member, per se, forms no part of the present invention. It consists of a steel plate which is bent in a heavy press so that its outer surface is provided with integral teeth 20 and outwardly extending flanges, while its inner surface 21 is preferably flat and provided with openings 23 for the aforementioned bolts 18.

In Fig. 6 there is a slightly modified form of retaining means 24 shown, in this instance two of them being provided, each of which is slightly shorter in length than the one shown in the preferred form. Also only one bolt opening 25 is necessary in the top and bottom walls as a cross bar 26 is provided which is longer in length than the one in the preferred form, this bar being bolted to both of the retaining members. Of course, the openings in the rims in this instance would have to be in alignment, whereas in the preferred form the openings may be staggered and the tractor shoes staggered, if desired.

From the foregoing it will be seen that I have provided a tractor shoe comprising a tread member and a retaining means in the form of a pressed metal tooth. Across the apex of the retaining means is bolted a locking bar which locking bar cooperates with a plate or housing riveted to the rim.

It will also be seen that the retaining means and tread member may rock with relation to the rim of the wheel and that the retaining means and tread member may move inwardly and outwardly with respect to the rim of the wheel and that the load on the locking bar is simply the weight of the retaining means and tread member as these parts are carried around with the revolution of the wheel.

The shoe as a whole is relatively light, relatively strong, and relatively cheap to manufacture and may be applied to any form of tractor wheel.

Many slight changes might be made without in any way departing from the spirit and scope of the invention.

Having thus described the same, what I claim as new and desire to secure by Letters Patent is:—

1. A tractor shoe comprising a tread member, a retaining means comprising a plate bent in the shape of a tooth, the apex of the tooth being flattened to form a plane surface, the retaining means adapted to be placed through an opening in a wheel rim, a cross bar secured to the flattened surface of the retaining means, and fastening means passing through the tread member, the retaining means and the cross bar for holding the shoe in operable relation to the rim.

2. A tractor shoe comprising a tread member, a retaining means comprising a plate bent in the shape of a tooth, the apex being flattened and the outer surface of the tooth also being flattened, the retaining means adapted to be passed through an opening in the rim of a wheel, a cross bar mounted on the flattened apex of the tooth and the length of the cross bar being greater than the length of the retaining means; the tread member, retaining means and cross bar provided with registered openings and a bolt passing through said openings for securing the said parts in fixed relation and the cross bar holding the several parts in operable relation to the wheel.

3. A tractor shoe comprising a tread member, a retaining means comprising a plate bent in the shape of a hollow tooth, the ends of the plate being contiguous and the inner portion of the tooth being flattened for the reception of a cross bar, a cross bar mounted on said tooth and the ends of the cross bar extending beyond the ends of the retaining means and being rounded on their outer surfaces, and locking means passing through the tread member, retaining means and cross bar for holding the several parts in position.

4. A tractor shoe comprising a tread member, a retaining means comprising a plate bent into the shape of a hollow tooth, the ends of the plate being contiguous and the inner portion of the tooth being flattened for the reception of a cross bar, a housing plate adapted to be placed about an opening in the rim of a wheel, said housing plate having an opening therein and short teeth thereon to cooperate with the side walls of the retaining means, the retaining means adapted to be placed through the opening in the retaining plate, a cross bar on the inner surface of the retaining means, and securing means comprising a bolt passing through the tread member, retaining means and said cross bar.

In testimony whereof I affix my signature.

WILLIAM E. WINE.